S. HOYT.
Sugar Evaporator.
No. 40,562.
Patented Nov. 10, 1863.
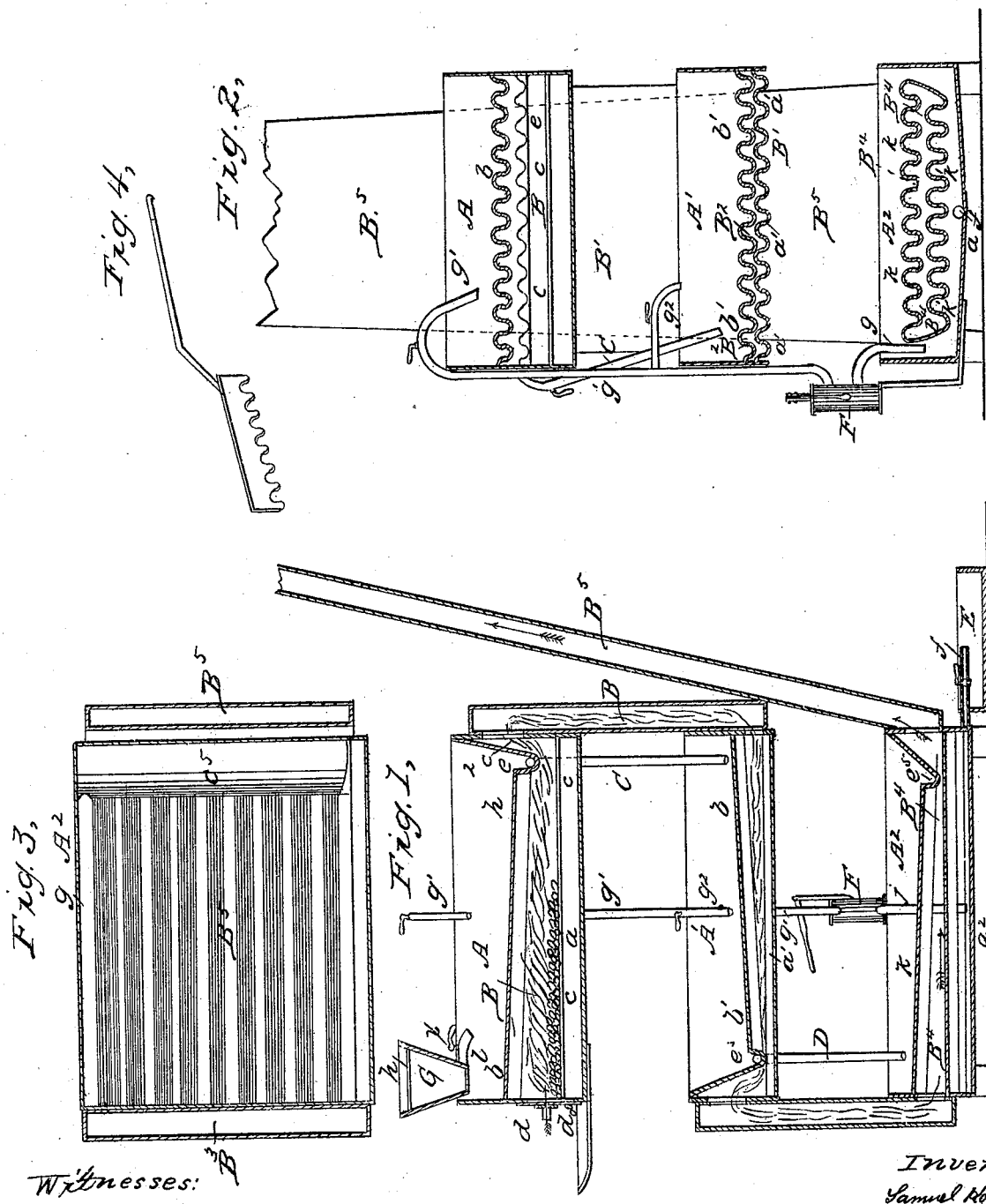

UNITED STATES PATENT OFFICE.

SAMUEL HOYT, OF NEW YORK, N. Y.

IMPROVED SUGAR-EVAPORATOR.

Specification forming part of Letters Patent No. 40,562, dated November 10, 1863.

*To all whom it may concern:*

Be it known that I, SAMUEL HOYT, of the city, county, and State of New York, have invented a new and Improved Sugar-Evaporating Apparatus; and I do hereby declare that the following is a full, clear, and exact description thereof, reference being had to the accompanying drawings, making a part of this specification, in which—

Figure 1 is a vertical longitudinal section taken centrally through the improved apparatus. Fig. 2 is a vertical transverse section taken through the apparatus at the point indicated by the red line $x\ x$ in Fig. 1, looking toward the rear thereof. Fig. 3 is a top view of the bottom pan of Figs. 1 and 2. Fig. 4 shows the scraper adapted for clearing the fluted or corrugated surfaces of sediment.

Similar letters of reference indicate corresponding parts in the several figures.

This invention relates to a new and improved apparatus for boiling and concentrating the juices of the maple and sugar-cane, the objects of which invention are to economize fuel in the operation of reducing the sirups; to obtain rapid evaporation without burning the sirups, and to adapt the different pans through which the juice or sirup is conducted to the different conditions of the sirup; and, finally, to obtain the desired end by means of a cheap apparatus, which can be readily controlled and kept clean with very little labor.

The nature of my invention consists in arranging the pans through which the sirup is passed during the boiling and evaporating process in, or nearly in, horizontal planes, one above the other, so that the heat arising from the lower pans will impinge upon the bottoms of the succeeding higher pans, thus utilizing, to a great extent, the waste heat, and consequently requiring less fuel in the operation, as will be hereinafter described.

It also consists of a pan (or series of pans) having a horizontal bottom and an inclined secondary bottom forming a flue-space at the bottom of the pan, so that by connecting a number of said pans together by flues the heat can be conducted from one pan to another either by an ascending draft or by a descending draft, and at the same time the juice in the pans can be made to flow over the surfaces of the inclined plates and the draft retarded sufficiently by the contracted flues to give off heat to the best advantage, as will be hereinafter described.

It also consists in so construcing the several pans of the series that they are especially adapted to the different conditions of the sirup which is conducted through them—*i. e.*, each pan in the series communicates different degrees of heat to the sirup, according to its consistency, without any liability of burning the sirup—as will be hereinafter described.

To enable others skilled in the art to make and use my invention, I will proceed to describe its construction and operation.

A $A'$ $A^2$ represent three quadrangular pans, which are each closed at bottom by horizontal plates $a$ $a'$ $a^2$, and supported one directly above the other at suitable distances apart. The highest pan, A, which may be made less shallow than the lower pans, has a secondary bottom, $b$, secured within it, which forms a fire-space, B, between it and the pan-bottom $a$, in which space a grate, $c$, is placed. The front of this pan A is opened to supply fuel to the fire-place B, and a sliding damper, $d$, is applied to the door $d'$, to admit air to the fire. The secondary bottom $b$ of the pan A has a corrugated or waved surface, the ridges or grooves extending from the front of the pan down to a transverse end trough, $e$, which inclines to one side of the pan, so that the juice will run down the grooves towerd the back end of the pan into the trough $e$, which, being inclined, as above described, will cause the juice to flow through the pipe C into and near the back end of the next pan, $A'$, the flow being regulated by a stop-cock in the pipe C.

The flue $B'$ communicates at its upper end with a chamber, $c^2$, in the upper pan, A, and at its lower end with the back end of the pan $A'$. This pan $A'$ has also two plates in its bottom, both of which are corrugated or waved, as shown in Fig. 2. These two plates $b'$ and $a'$ form between them a flue, $B^2$, which conducts the products of combustion from the descending flue $B'$, beneath the juice in pan $A'$, and discharges these heated gases into a descending flue, $B^3$, whence they are carried through a corrugated flue, $B^4$, which passes through the lowermost pan, $A^2$, as shown in Figs. 1 and 2, the products of combustion finally escaping through the ascending flue or chimney $B^5$ at the back of the pan $A^2$, as shown clearly in Fig. 1. The products of combustion arising in the fire-chamber B under the secondary bottom of the uppermost pan are thus conducted in a zigzag course through the three pans A, A', and A². The two corrugated plates $a'$ $b'$ in the second pan, A', need not be set so far apart as the plates $a$ $b$ of the upper pan, A, as there is no fire to be made between these plates $a'$ $b'$. The plate $b'$ inclines from its back to its forward end, and empties its contents into an inclined trough, $e^3$, from which the sirup is drawn through a pipe, D, and emptied into the lower pan, A². This lowermost pan, A², has a wide flue, B⁴, extending longitudinally through it, which inclines toward the back end of its pan and communicates at its lowest end with the chimney, as above stated. The corrugated upper surface of this flue terminates at its lowest end in a trough, $e^5$, which receives the juice or thick sirup from the upper part of the flue and discharges it into the pan A² below this flue B⁴. The object of this latter trough is merely to prevent any of the sirup from remaining on the top of the corrugated flue after the pan A² is emptied, for it will be seen by reference to Figs. 2 and 3 that the sides of the pan are some distance from the sides of the flue B⁴, and that this flue passes through the sirup in this pan. The bottom of the pan A² is made of flat metal, and it inclines from the sides of the pan toward its middle, thus causing the sirup to flow toward this point. The pipe $f$ is used to draw off the cooked sirup into the cooling-pan E. (Shown in Fig. 1.)

On one side of the apparatus I have arranged a pump, F, the suction-pipe $g$ of which leads down to the bottom of the pan A², and the force-pipe $g'$ leads upward into the uppermost pan, A. The branch pipe $g^2$ leads into the pan A', and these pipes are furnished with faucets which are used to discharge the sirup into either one or the other of the pans A A', the pump F being used to force the sirup through these pipes.

The surfaces of the corrugated plates $b$ $b'$ may be inclined in two directions—i. e., to one corner of the pan, if desirable—but in practice the inclination of the troughs $e$ $e^3$ will be sufficient to conduct off the sirup from the inclined surfaces of the plates $b$ $b'$.

This entire apparatus may be inclosed by masonry, or constructed and arranged as shown in Figs. 1 and 2; and, if desirable, the pans may be reversed and the lowest pan made the highest, in which event the juice or sirup must be pumped up from one pan to another; but the arrangement which I have above described will be found the most convenient and to require the least labor.

The operation of the apparatus is as follows: Fire is made in the fire-place B and the products of combustion pass from one pan to the other, as indicated by the arrows in Fig. 1. The raw juice is poured through a fine strainer, $h$, into an oblong trough, G, from which the juice is allowed to flow slowly into the pan A, the flow being controlled by the faucet $i$. The juice is subjected to the cooking process in this pan, and it receives here the most intense heat of the fire. From this pan A the cooked juice is drawn off through pipe C into the next pan, A', and discharged upon the highest point of the corrugated plate $b'$. Here the juice, or rather the sirup, is subject to a heat which is not as intense as it received in the upper pan, A. The heating-surface of the pan A' is increased by the waved surfaces of the two plates $a'$ $b'$, and after having been submitted to this pan the sirup is conducted down through the pipe D into the lowermost pan, A², where it is exposed to the heated surfaces of the corrugated plates $k$ $k'$ of flue B⁴, which passes through the juice in this latter pan. Thus it will be seen that the heated surfaces to which the sirup is subjected in its passage through the series of pans are gradually increased. First, we have the finely-corrugated plate $b$, having a slight inclination. Here the juice is cooked. Then we have another corrugated plate with a similar plate beneath it, which gives a greatly-increased flue-space; and, finally, where the heat would be least intense the two corrugated surfaces of the flue B⁴ are exposed to the sirup. By this arrangement of heated surfaces and flues I am enabled to carry on the process of evaporation with very little fuel, and to obtain the advantages of having the pans arranged one directly above another in horizontal planes, combined with the inclined evaporating-plates, which latter cause the juice to flow toward the ends of the pans in order that it may be readily drawn from one pan to another. Then, again, by having the double bottoms in the pans A A' the terminus of the flue in each pan can be so contracted as to retard the draft sufficiently to allow the products of combustion to give off the greatest amount of heat, and by this form of flue the juice or sirup will be subjected to a uniform degree of heat in its passage over each heated surface. The pump with its branch pipes enables me to force the sirup back again into either one or both of the upper pans to resubject it to these pans, if this be found necessary.

The scraper shown in Fig. 4 is used to prevent the sirup from burning when it is thick.

Having thus described my invention, what I claim as new, and desire to secure by Letters Patent, is—

1. Forming a flue communication between two or more evaporating-pans, arranged one above another, and constructed with gradually-diminished flues in their bottoms, substantially as herein described.

2. Increasing the amount of heating-surfaces of the flues in the several succeeding pans according to the different conditions of the sirup subjected to these pans, substantially as described.

3. The combination of the inclined longitudinally-corrugated evaporating-surfaces with the transverse receiving-troughs and discharge-pipes, substantially as described.

4. Constructing the pan $A^2$ with a central corrugated flue, $B^4$, passing through it and communicating with the common flue of the series of pans, substantially as described.

5. Constructing the pan $A'$ with a corrugated evaporating-plate, $b'$, and a corrugated bottom plate, $a'$, both plates forming a flue of increased capacity, and constituting the bottom of said pan, substantially as described.

6. A series of evaporating-pans arranged in or nearly in horizontal planes, one above another, and furnished with inclined evaporating-surfaces, and a common flue running through the whole, substantially as set forth.

7. In combination with the system of evaporating-pans, arranged substantially as described, the system of pipes for changing the sirup from one pan to another, substantially as set forth.

Witness my hand in the matter of my application for a patent for an improved sugar-evaporator.

SAMUEL HOYT.

Witnesses:
EDM. F. BROWN,
R. T. CAMPBELL.